United States Patent [19]
Mori et al.

[11] 4,308,492
[45] Dec. 29, 1981

[54] METHOD OF CHARGING A VEHICLE BATTERY

[75] Inventors: Kazumasa Mori, Aichi; Tetsuo Kato, Anjo; Katsuya Muto, Kariya; Etsushi Miura, Nishio, all of Japan

[73] Assignee: Nippondenso Co., Ltd., Kariya, Japan

[21] Appl. No.: 88,055

[22] Filed: Oct. 24, 1979

[30] Foreign Application Priority Data

Oct. 24, 1978 [JP] Japan .................................. 53-131146

[51] Int. Cl.³ .............................................. H02J 7/14
[52] U.S. Cl. ....................................... 320/32; 320/35; 320/39; 320/43; 322/23
[58] Field of Search ........................ 320/31, 32, 35, 36, 320/39, 43, 48, 64, 68; 322/24, 25, 28, 33, 34, 22, 23

[56] References Cited

U.S. PATENT DOCUMENTS

| | | | |
|---|---|---|---|
| 1,988,192 | 1/1935 | Drabin | 320/48 X |
| 2,802,164 | 8/1957 | Staggs | 320/12 |
| 3,496,447 | 2/1970 | Thompson | 322/33 X |
| 3,535,616 | 10/1970 | Rutherford et al. | 322/33 X |
| 3,652,915 | 3/1972 | Eberts | 320/31 |
| 3,868,558 | 2/1975 | Winkley et al. | 320/68 X |
| 4,210,855 | 7/1980 | Harer et al. | 320/32 X |

*Primary Examiner*—Robert J. Hickey
*Attorney, Agent, or Firm*—Cushman, Darby & Cushman

[57] ABSTRACT

A new method of charging a vehicle battery is disclosed. The proposed method employs electronically controlled data processing device, which controls battery charging condition in accordance with temperature, battery electrolyte, external electric load as well as battery voltage. As a result, voltage drop due to over loading may be prevented and a stable battery charging voltage may be obtained.

4 Claims, 5 Drawing Figures

METHOD OF CHARGING A VEHICLE BATTERY

The present invention relates to a method of charging a vehicle battery.

Conventional voltage regulating systems control the generator merely in accordance with a reference voltage with temperature compensation by a thermistor and, therefore an optimum control taking account of an external load and the degree of battery charging not achieved.

With the aim of avoiding the above disadvantages we propose, in accordance with the present invention, controlling charging of the vehicle battery by means of an electronically controlled data processing device such as a micro computer.

It is a primary object of the present invention that information related to temperature of the battery electrolyte and external electric load plotted as parameters into temperature-load-regulated voltage characteristic, based on which a regulated voltage corresponding to a temperature and load is obtained, and that the regulated voltage and the battery charging voltage are compared to control the field excitation of the vehicle generator. As a result, voltage drop due to over loading may be prevented and a stable battery charging voltage may be obtained. Further, a voltage suitable for the battery charging characteristic and an optimum condition for battery long life may be obtained.

It is also an object of the invention to provide a device in which the above electric power control is suitably made by use of an electronic operation process and the battery charging voltage may be controlled to be a desired regulated voltage depending on a plurality of information data.

Embodiments of the present invention will now be described by way of example with reference to the accompanying drawings.

Figure 1:
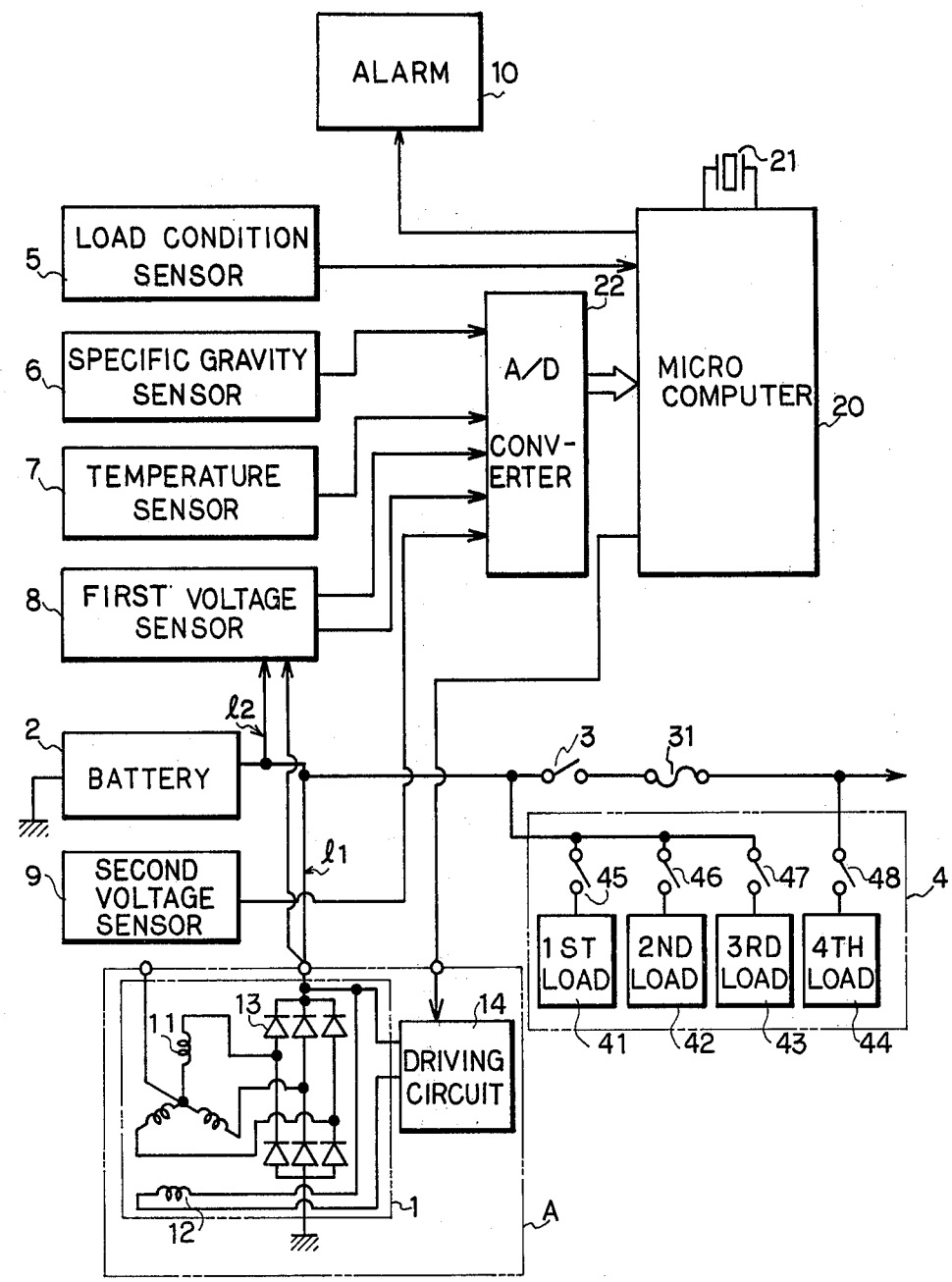
FIG. 1 is a block diagram of a voltage regulating system for a vehicle generator.

The block A shown in FIG. 1 is mounted in the engine compartment of a vehicle. A Y-connected-three-phase alternator driven by the vehicle engine, comprises armature windings 11, a field exciting coil 12 and full-wave rectifier 13 for rectifying three phase a.c. current generated by the Y-connected windings.

A driving unit 14 for controlling the energization of the field coil in accordance with signals described later, consists of a power transistor and a control element for driving the power transistor in response to its input signals and mounted on the alternator case or housing.

The block A has three or four output terminals. Reference number 2 indentifies a vehicle amounted battery charged by the alternator 1 for energizing various kinds of electric loads at 12 volts. 3 is an ignition switch or accessory switch disposed in the passenger compartment, and 31 is a fuse for protecting electric components and devices against excessive currents caused by short circuiting. The vehicle electrical load 4 is made up of 41, 42 and 43 via switches 45, 46 and 47, first to third loads connected to the battery 2 and fourth load 44 connected to the same battery 2 via switch 48 and key switch 3.

Typical examples of the first to third loads 41, 42 and 43 are side lights (about 8 w×4), small lamps (about 8 w×4), dipped lower head light beams (about 50 w×2), fuller upper beams thereof (about 75 w×2) and stop lights (about 23 w×2); and a starter (about 800 w). The fourth load may be the windshield wipers motor (about 30 w), indicator lamps (about 57 w in total) and power window motors (about 60 w).

Next, 5 is a load condition sensor for generating a load made signal, for example, a signal SW1 when the head lights are dipped and a signal SW2 when the head lights are on full beam.

The sensor detects a voltage across resistors of high resistance each of which is connected in parallel with both head lights or, in case of four head lights type, having upper and lower beams separated from each other, generates signals by a photo-sensitive element disposed adjacent the head lights.

Figure 5:
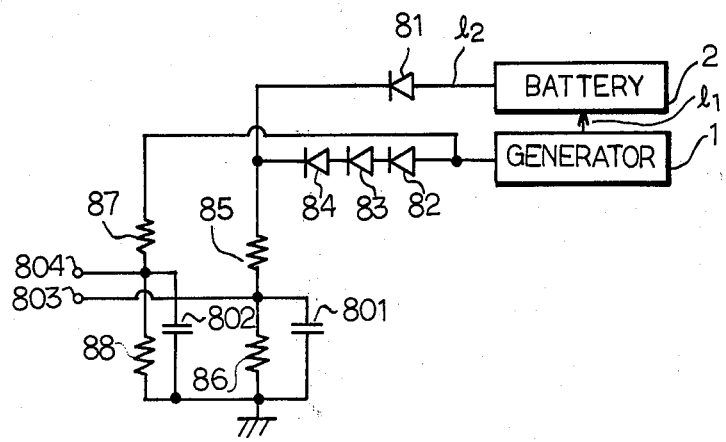
FIG. 5 is an electric circuit diagram of a first voltage sensor shown in FIG. 1.

6 is a specific gravity sensor such as a conventional float sensor disposed within the battery for generating a signal S indicating the specific gravity of the battery electrolyte liquid continuously or intermittently in the range from 1.18 to 1.30. A temperature sensor consisting of thermistor or temperature sensitive transistors is dispersed in the battery electrolyte liquid or battery case to produce a signal T indicating the temperature of the electrolyte liquid or electrode plate which is related to the battery charging characteristics. A first voltage sensor 8 having as its input signals a battery 2 charging voltage and generator 1 output voltages, generates a battery charging voltage signal Vx as a first output signal in the normal operation and an output voltage Vy when electric power supply line 1, or voltage detecting lead wire 12 is disconnected or in the event of some other terminal disconnection. The generator output signal Vy is continuous. An example of the first voltage sensor 8 is shown in FIG. 5, which comprises a diode 81, a plurality of diodes 82, 83 and 84 for compensating voltage drop of the power supply line 11, voltage dividing resistors 85, 86 87 and 88 and smoothing capacitors 801 and 802. The first and second output signals appear respectively on terminals 803 and 804. If only the disconnection of the power supply line L1 or voltage detecting lead wire 12 is to be detected, resistors 87 and 88 and capacitor 802 can be eliminated. A second voltage sensor 9 determines whether the generator 1 operates normally or not by detecting whether or not the neutral point voltage attains a predetermined value. When operation is normal a neutral voltage signal VN is generated. However, engine speed or signal from one of the armature windings is also available instead. To indicate an excessive voltage an alarm 10 is triggered, by an electronic data processing unit comprising a micro-computer 20 which executes digital operation of software in accordance with a quartz oscillator 21 of several MH and supplied with 5 volts stabilized voltage to control the alarm 10 and driving unit 14 in response to signals from the sensors 5 to 9.

This micro-computor 20 is cone-chip-type large scale integrated circuit (LSI) comprising a read only memory (ROM) for storing the control program which determines each operation step to enable optimum operation of the alarm 10 and driving unit 14, a central processing unit (CPU) for executing operations corresponding to the control programs which are successively read from the ROM, a random access memory (RAM) for temporarily storing various data relative to the operation and enabling the CPU to read its data, clock pulse generator and an input-output circuit (I/O) circuit) including a latch circuit.

A/D converter 22 converts analog signals from the specific gravity sensors 6, temperature sensor 7, first voltage sensor 8, and second voltage sensor 9, to digital signals, its output being applied to the micro-computer.

In this embodiment, operation of the micro computer is executed in a predetermined constant period. When energization of the field exciting coil 12 is controlled in response to result of the operation process, various factors including the capacity of the generator, the field exciting coil 12's response time, capacity of the battery and the response time of control circuits should be taken into account for setting the operation period. If, for example, the operation period is set comparatively long, longer than 25 milli-seconds, for example, voltage fluctuations caused by ripple voltage components in the regulated voltage increase so that brightness of the vehicle lamps may fluctuate. On the other hand, if the operation period is set too short to decrease the ripple components, the average field exciting current may be decreased due to the inductance of the field exciting coil with the result that insufficient output power is available in the low speed range.

Taking the above into consideration, the operation period of this embodiment is set in the range 0.5 to 5 milliseconds.

Figure 2:
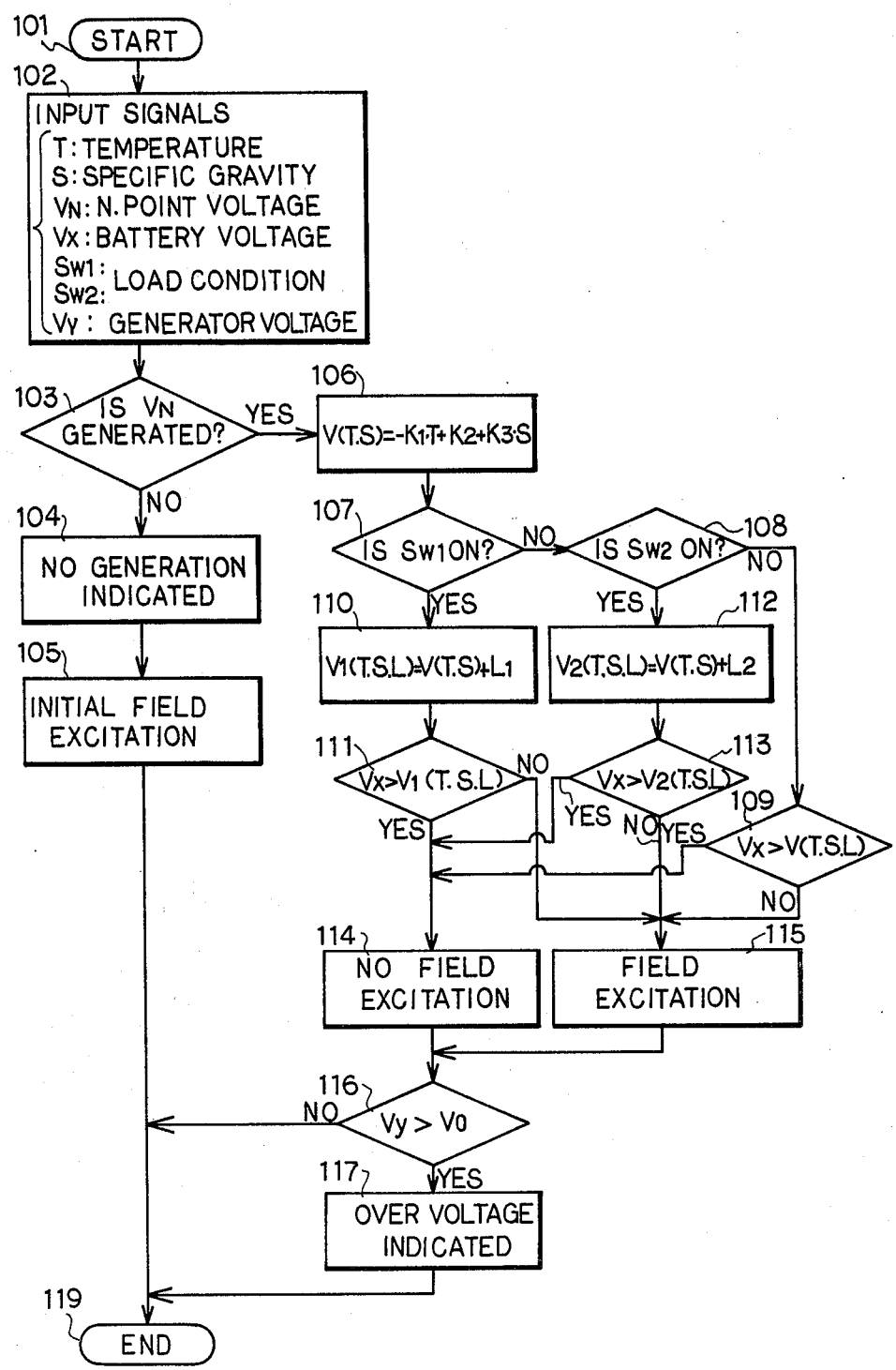
FIG. 2 is a flow chart illustrating operation of the micro-computer in the system of FIG. 1.
Figure 3:
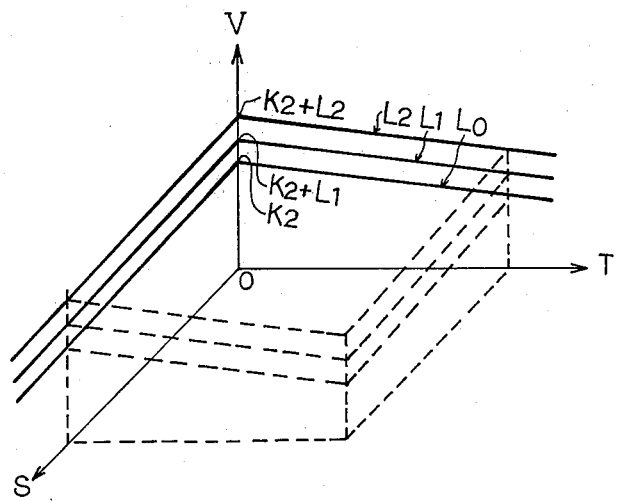
FIG. 3 is a graph showing the relationship between the temperature T, specific gravity S and regulated voltage V, for various electrical loads.

Operation of the above described system is explained below with reference to flow chart FIG. 2 illustrating operation of the alarm 10 in response to a control program of the micro-computer and regulation of the generator 1, and the graph of FIG. 3 illustrating the relationship between temperature, specific gravity, and regulated voltage at different loads.

In FIG. 3 the characteristic curve of temperature T against regulated voltage V is generally set, by means of a semiconductor element, to have a negative slope of, for example, 0.002 v 0.012 V/C, in consideration of the range allowed with respect to temperature—charging voltage characteristics and electric loads. The characteristic curve of specific gravity against regulated voltage V has an extremely small negative gradient relative to the specific gravity to prevent gas generation from the battery due to an over-charging. Such curves are based on the relation between the specific gravity and battery charging condition and determined by battery charging condition independently of temperature so that when the battery is not fully charged the voltage to be regulated is set comparatively high and when the battery is nearly fully charged, the voltage to be regulated is made comparatively low. Further, the heavier the load (L0, L1 and l2) the higher is the voltage to be regulated so as to increase frequency of excitation thereby increasing generator output to avoid a reduction in the battery charging voltage Vx.

Referring now to FIG. 2, when the key switch 3 is closed, a voltage stabilizing circuit (not shown) supplies the micro computer 2 with a stabilized voltage of 5 volts to energize the micro computer and initiate the operating sequence which steps on, in a predetermined period of 0.5 to 5 milliseconds, from step 101 "START" to step 102 "INPUT SIGNALS" 102. In this state load signals SW1 and Sw2 are obtained from the load sensor 5, specific gravity signals 5 from the specific gravity sensor 6, temperature signals T from the temperature sensor 7, battery charging voltage signals VX and generator output voltage VY signals from the first voltage sensor 8 and neutral voltage signals VN are sensed by the second voltage sensor 9. All of these signals are stored by the RAM before proceeding to the discrimination step 103 which determines, whether the generator driven by the vehicle engine is in operation or not, this being indicated by the stored neutral voltage signals. When the engine stops or the generator fails, the neutral voltage is not generated and no neutral voltage signal VN from the first voltage sensor 8 appears so that the result of the discrimination step becomes "NO", followed by the step of "NO GENERATION" 104. On the other hand, when the generator is in operation, the neutral voltage signals VN is present and the positive ("YES") result of the discrimination 103 steps on to the regulated voltage calculation step 106. Before the engine is started, the "NO GENERATION" indicating step 104 follows and the micro-computer 20 latches the signal to operate the alarm 10 at its I/O circuit until another command signal is generated, indicated by the content of the ROM, whereby the alarm 10 which may be a visual alarm, is activated to warn an operator of no-generation of the generator 1.

At step 105, initial field exitation of the generator is achieved by means of a driving circuit 14 for energizing the field coils 12 in response to initial field exciting signals having a constant frequency and produced by the micro-computer for a unit operation period in accordance with the indication of the ROM before the end of the unit operation process cycle in the following step 119. The field circuit is switched on and off at a predetermined frequency to cause the initial field excitation without the need for current limiting resistor to limit the average field exciting current to a desired value (for example 300 m A maximum). As stated above, the routine comprising the steps 101, 102, 103, 104, 105 and 119 is repeated when the key switch is closed until the engine is started. A "NO GENERATION" warning is given by the alarm 10 with the initial field excitation being made.

When the generator 1 starts, a neutral voltage is generated and, consequently, the first voltage sensor 8 generates a neutral voltage, signal VN and the positive result of the step 103 initiates the regulated voltage calculation step 106. The first regulated voltage V(T,S) is given from the following equation as a function of the temperature signal T, specific gravity signal S, memorized in the input signal step 102 and predetermined proportional constants K1 and K2 determined respectively relative to the temperature—regulated voltage and the specific gravity—regulated voltages.

$$V(T,S) = -K1 \cdot T + K2 - K3 \cdot S \tag{1}$$

After derivation of the first regulated voltage V (T,S) the step 106 is followed by a first load condition discrimination step 107 in which the result is YES if the first load condition signal SW corresponding to the dipped head lights beams is generated and the second regulated voltage calculation step 110 follows. On the other hand in the presence of the second load condition signal SW2 corresponding to the main head lights beams the result is "NO" producing a positive "YES" result in the second load condition discrimination step 108, the third regulated voltage step 112 will follow. A negative result in step 108 on the other hand, initiates discrimination step 109.

During daytime the head lights are not necessary and, therefore, neither the first nor the second load condition signal SW1 or SW2 is generated. Accordingly, the sequence begins at step 101 and proceeds through the steps 102, 103, 106, 107, 108 to the voltage discrimination step 109. In this discrimination step 109, the battery charging voltage signal VX stored in the "INPUT SIGNAL" (T,S) obtained in the first regulated voltage calculations step 106 are subtracted to produce a difference signal which may or may not be greater than zero.

If the result of discrimination step 109 is "NO", that is if the battery charging voltage VX is lower than a desired first regulated voltage V (T,S), the process will proceed to the "FIELD EXCITATION" step 115, in which, in accordance with the ROM, the I/O circuit latches the signal to drive the field exciting coil 12 until another command signal is generated in the next succeeding cycle of operations to energize the field exciting coil 12 through the driving circuit 14, thereby increasing the generator output power. On the other hand, if the result of the voltage discrimination step 109, is "YES" that is, if the battery charging voltage VX is greater than the desired first regulated voltage V (T,S), the "NO FIELD EXCITATION" step 114 will follow. In this case the I/O circuit latches the signal to stop energization of the field exciting coil 12 until another command signal is generated in the next suceeding operating cycle, so lowering the output power of the generator. In the excess voltage discrimination step 116 the (stored) generator output voltage VY and an allowable voltage VO indicative of the highest value of a predetermined maximum allowable voltage, are compared so that when the generator output voltage VY is higher than the allowable voltage VO, the positive "YES" results initiates the excess voltage indication step 117. The I/O circuit then latches the signal to energize and deenergize the alarm in accordance with the instruction of the ROM, whereby the alarm 10 flashes to notify an operator or the like of the fact that the generator 1 output voltage VY is excessive before the end step 119. Further, if the generator output voltages VY in the voltage discrimination step 116 is lower than the allowable voltage VO in step 116 to produce a negative "NO" result, the "END" step will follow and a unit operation process cycle is completed. As stated above, in the day time running of an automobile without using the head lights or without load condition signals SW1 or SW2 the battery charging voltage VX is controlled to become the predetermined regulated voltage V (T,S) by energizing or de-energizing the field coil of the generator to control generator output voltage. The aimed desired voltage V (T,S) is obtained as a single point from the predetermined region L0 of the graph of FIG. 3 in the temperature T specific gravity S plane.

When the automobile is driven at night and the head lights are dipped, the first load condition signal SW1 is generated accordingly. As mentioned above the operating sequence progresses from the step 101 through the steps including 102, 103, 106 and 107 and to the second regulated voltage calculation step 110. In this step 110, the second regulated voltage V1 (T.S.L.) is obtained in accordance with the following equation as a function of the first regulated voltage V (T.S.) and first correction value L, predetermined for correcting the regulated voltage.

$$V1(T, S, L) = V(T,S + L1) \tag{2}$$

After the second volage V1 (T,S,L) is obtained in this second regulated voltage V1 (T,S,L), the voltage discrimination step 111 follows. In this discrimination step 111, the battery charging voltage signal VX stored in step 102 and the second regulated voltage V1 (T,S,L) obtained from the second regulated voltage calculation step 110 are compared to determine which of the voltages VX or V1 (T,S,L) is the greater.

If the result of this discrimination step 111 is "NO" or $VX \leq V1$ (T,S,L), the "FIELD EXCITATION" step follows, the field coil being energized to increase the generator output power before proceeding to the "OVER VOLTAGE INDICATION" step. On the other hand if the result is "YES" or $VX > V1$ (T,S,L) "NO EXCITATION" step follows so that the field coil is de-energised to decrease the generator output voltage and the sequence reaches to the excessive voltage discrimination step 116. In this discrimination step 116, the generator output voltage VY temporarily stored in the above "input signals" step 102 and predetermined allowable voltage VO are compared. If the comparison result is "YES" or $VY > VO$, "OVER VOLTAGE INDICATION" step follows to flash the alarm 10 until another command signal is generated in the subsequent operating sequence or cycle. On the other hand, if the result is "YES" or $VX > V1$ (T,S,L) the sequence moves to "NO FIELD EXCITATION" step 114 to de-energize the field coil so lowering the generator output voltage, and hence to over voltage discrimination step 116. The generator output voltage VY temporarily stored in the above "INPUT SIGNALS" step and the predetermined allowable voltage VO are compared. If the result is YES or $VY > VO$, the "OVER VOLTAGE INDICATION" step 117 follows to flash the alarm 10 until another command signal is generated in the next operating sequence or cycle before the "END" step.

Next, when, at night, the headlight beams are on full the second load condition signal SW2 instead of the first load condition signal SW1 is generated. Accordingly, the operating sequence progresses through the steps 101, 102, 103, 106, 107 and 108 and the third regulated voltage calculation step 112. In step 112, the third regulated voltage is given according to the following equation based on the first regulated voltage V (T,S,) obtained in the first regulated voltage step 106 and a second predetermined regulated voltage correction value L2.

$$V2(T,S,L) = V(T,S) + L2 \tag{3}$$

After the third regulated voltage has been obtained in this step 112, the voltage discrimination step 113 follows, wherein the battery charging voltage VX and the third regulated voltage V2 (T,S,L) are compared to determine whether their difference is greater than zero or not.

If the result of the comparison step 113 is NO or $VX \leq V2$ (T,S,L), the sequence moves to the "FIELD EXCITATION STEP" 115 before the over voltage discrimination step 116. On the other hand, if the result is YES or $VX > V2$ (T,S,L), the "NO EXCITATION" step follows to de-energize the field coil. This in turn is by the over voltage discrimination 116 in which the generator output voltage VY temporarily stored in the "INPUT SIGNALS" step 102 and the predetermined allowable voltage VO are compared. If VY>VO, a "YES" signal is generated to initiate the OVER VOLTAGE INDICATION STEP 117, where the over voltage condition is indicated by the alarm 10 pending receipt of another command signal during the next operating sequence or cycle and the "END" step follows. On the other hand, when VY<VO, the negative result in the discrimination step 116 is followed by the "END" step 119 to complete a unit operating sequence cycle.

As stated above, when comparatively heavy loads such as headlights are connected a characteristic plane L1 or L2 is obtained by adding to the ordinary characteristic plane LO a correction value (L1 or L2 for example) in response to the heavy load degree and a single point in the plane L1 or L2 corresponding to a temperature signal T and specific gravity signal S is selected to determine an aimed regulated voltage V (T,S,L), and the regulated voltage V (T,S,L) and the battery charging voltage VX are compared to control the field excitation of the generator 1 according to the comparison so that the battery charging voltage VX approaches the desired regulated voltage V (T,S,L).

In the above embodiment, when the electrical load is increased, a desired regulated voltage increases. As a result insufficient generator output voltage and battery charging due to the heavy generator load may be effectively prevented.

When either one of the normal power supply line L1 and normal voltage detecting line L2 is disconnected, the normal battery charging voltage is not obtained and a generator output voltage VY is generated instead of the battery charging voltage VX since diodes 82, 83 and 84 are conductive instead of the diode 81 as shown in FIG. 5. Accordingly, the micro-computer 20 takes the generator output voltage signal VY for the battery charging voltage signal VX so that the operating sequence proceeds in accordance with the program in which VX=VY, thereby controlling the generator output voltage within a predetermined value. When the first voltage sensor 8 is constructed as shown in FIG. 5, the control voltage is slightly higher by an amount proportional to the difference between the voltage drop of the two diodes and that of the voltage supply line L1.

The above described sequence from the "START" step 101 to the "END" step 119 is completed within several tens or several hundreds of micro-seconds (μsec), and the operation sequence by the control program is executed in a period of 0.5 m sec–5 m sec. In the remaining time, other operations such as an engine ignition timing, fuel injection and monitoring of abnormal operation of various parts, are executed.

Figure 4:
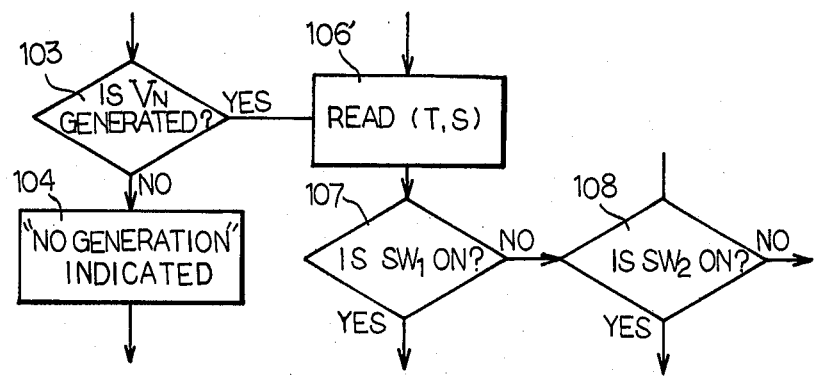
FIG. 4 is a flow chart illustrating the operation of another embodiment of the present invention.

The embodiment of FIG. 4 differs from that of FIG. 2 in that the regulated voltage V (T,S) is not obtained by calculation based on temperature—specific gravity—regulated voltage characteristic curve, but by read-out of a predetermined map FIG. 3 into which the predetermined basic plane LO is formed. The map is formed in the ROM incorporated in the micro-computer 20.

Other operations are the same as for the embodiment of FIG. 2. Since this embodiment does not execute four arithmetic operations for the first regulated voltage as the step 106, the operation time of the control program may be made shorter.

In the above embodiment, the temperature-regulated voltage characteristic curve is defined in straight lines having negative gradient. However, this relationship may be changed optionally with conditions depending upon the conditions of use, environment, battery charging characteristics, and allowable voltage range of the vehicle electrical equipment.

In the above embodiment, the load sensor 5 generates the load signals SW1, SW2 in response to the head lights being lit, by which signals SW1 and SW2 the regulated voltage is corrected. However, windshield wipers or other electrical devices may be included in the electric load sensed by the electric load condition sensor 5. In place of the load driving switch, the electrical load may be detected directly by detection by the load current which is representative of the load.

The battery electrolyte temperature may be detected from the electrode plate, battery body or its surroundings instead of the electrolyte itself.

We claim:

1. A method of charging a vehicle battery comprising the steps of:

detecting the actual charging voltage produced by a generator connected for charging the battery, the temperature of the battery, a parameter representative of the battery charging condition and the battery load current, deriving regulated voltage values which are functions of one or more of the battery operating temperature, the parameter representative of the battery charging condition and the battery load current, obtaining an optimum voltage value corresponding to the battery voltage, temperature of the battery, battery charging condition and battery load current in accordance with the predetermined regulated voltage values, comparing the said battery charging voltage with the said optimum voltage value, and controlling operation of the generator in accordance with the result of the said comparison to adjust the battery charging voltage to the said optimum voltage value.

2. A method according to this claim 1, wherein the said temperature is temperature of battery electrolyte and the parameter representative of the battery charging condition is the specific gravity of the battery electrolyte.

3. A method according to claim 1 further comprising the steps of generating an alarm when the generator is not operating.

4. An apparatus for controlling a vehicle alternator used to charge a vehicle battery and having a field winding, Y-connected armature windings for generating an alternating current voltage in accordance with the energization of said field winding, and a rectifier circuit for rectifying said alternating current voltage to produce a direct current charging voltage, said apparatus comprising:

means for detecting a power supply condition from said vehicle battery to vehicle electric loads;

means for detecting the temperature of said battery;

means for detecting the specific gravity of electrolyte of said battery;

means for establishing a desired value of said charging voltage in accordance with said detected power supply condition, said detected temperature and said detected specific gravity, said desired value being increased in accordance with the increase in said detected power supply and with the decreases of said detected temperature and said detected specific gravity;

means for detecting an actual value of said charging voltage applied to said vehicle battery;

means for detecting a neutral point voltage of said Y-connected armature windings;

means for comparing said detected neutral point voltage with a predetermined reference value;

means for energizing said field winding of said vehicle alternator at a fixed frequency when the output of said comparing means indicates that said detected neutral point voltage is smaller than said predetermined reference value; and means for energizing said field winding of said vehicle alternator as long as said actual value of said charging voltage is smaller than said desired value of said charging voltage when the output of said comparing means indicates that said detected neutral point voltage is larger than said predetermined reference value.

* * * * *